G. K. COLE.
TRACTION ENGINE DRIVE.
APPLICATION FILED AUG. 25, 1914.
1,173,486.
Patented Feb. 29, 1916.
2 SHEETS—SHEET 1.
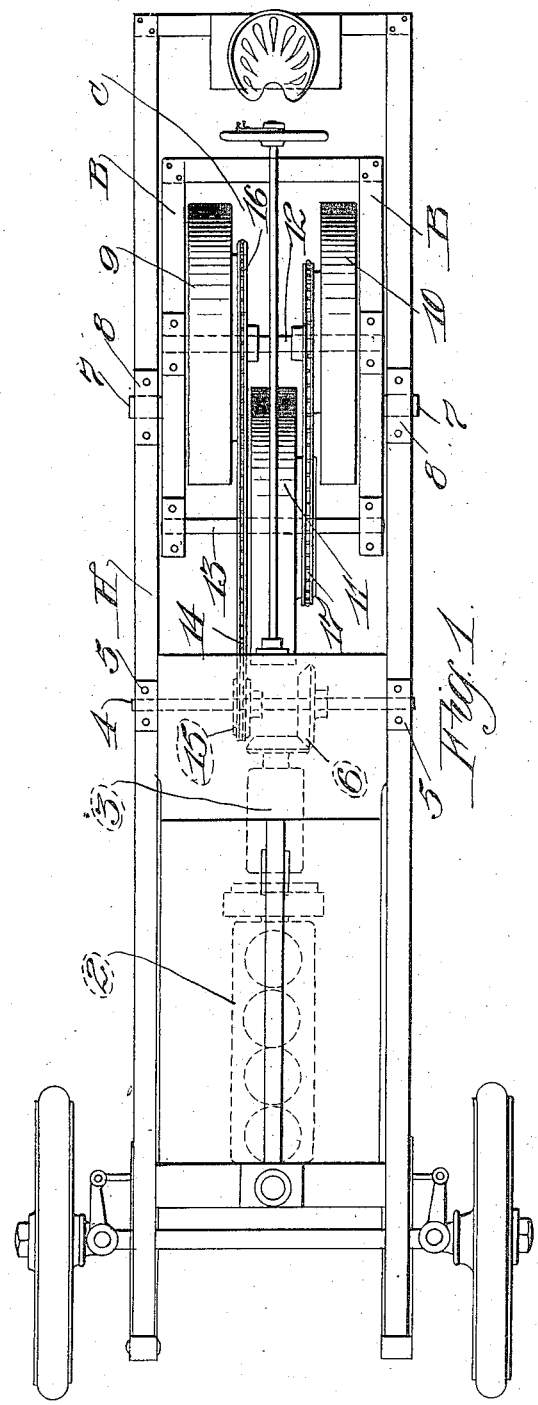
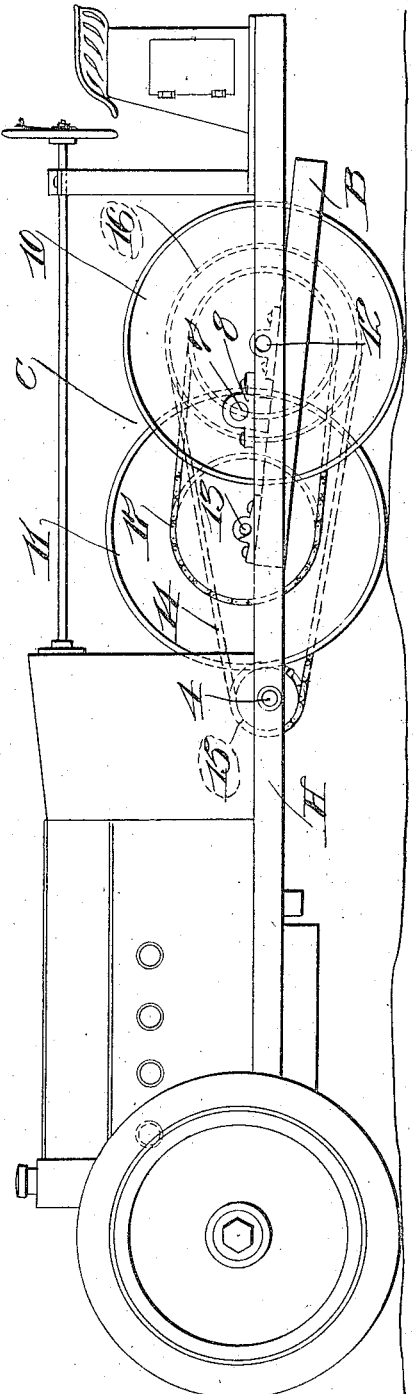
WITNESSES:
Thos. Eastberg
Charles Pickles
INVENTOR
George K. Cole
BY G. H. Strong
ATTORNEY

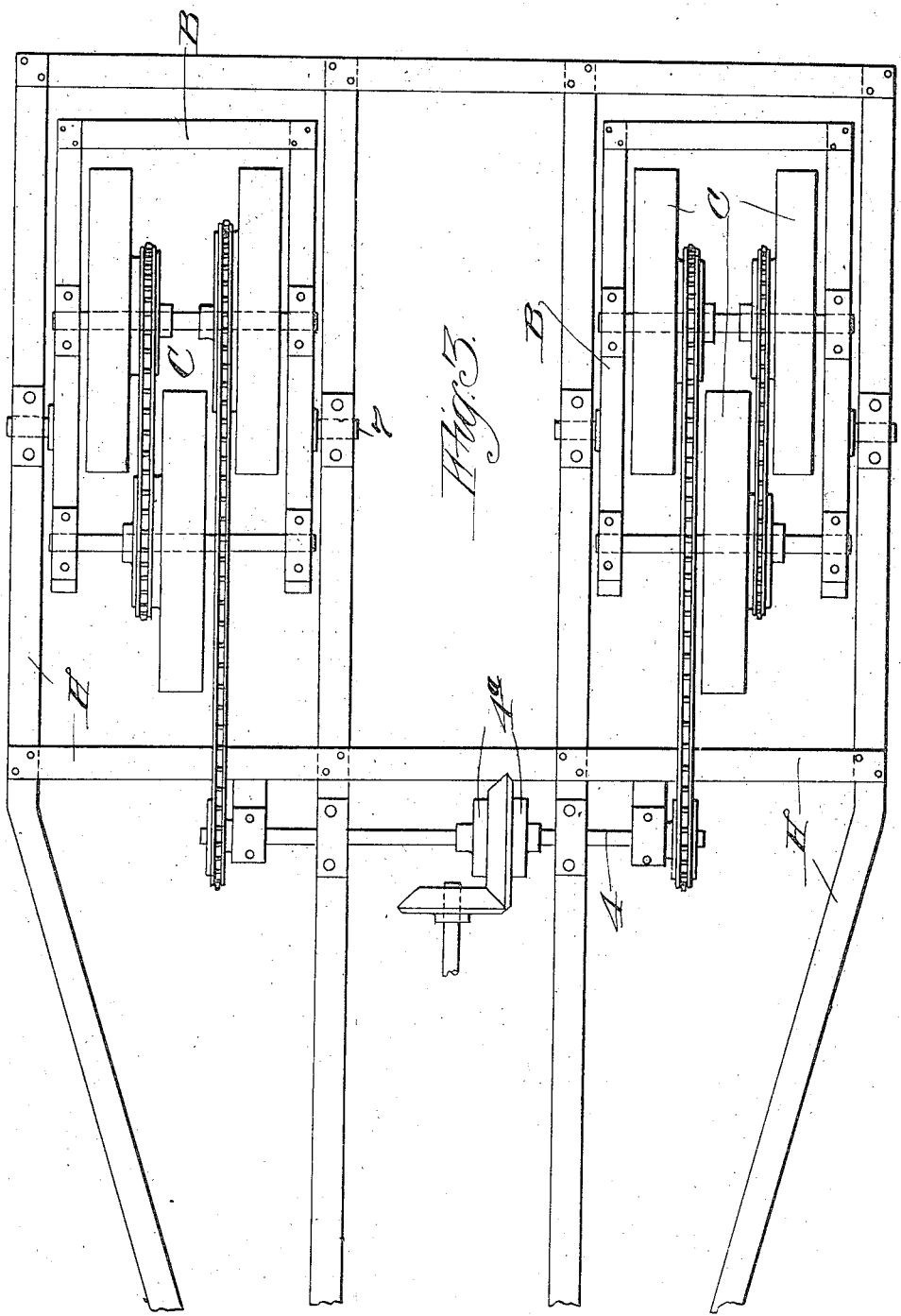

UNITED STATES PATENT OFFICE.

GEORGE K. COLE, OF HOLLISTER, CALIFORNIA.

TRACTION-ENGINE DRIVE.

1,173,486.   Specification of Letters Patent.   Patented Feb. 29, 1916.

Application filed August 25, 1914. Serial No. 858,430.

*To all whom it may concern:*

Be it known that I, GEORGE K. COLE, a citizen of the United States, residing at Hollister, in the county of San Benito and State of California, have invented new and useful Improvements in Traction-Engine Drives, of which the following is a specification.

This invention relates to a traction engine drive.

The object of the present invention is to provide a three-wheel driving unit for motor driven tractors and like vehicles, and to provide a novel connection by which power may be transmitted from the engine of the tractor to each individual wheel in the unit.

Another object of the invention is to provide a secondary frame for the purpose of supporting the three wheels of the driving units, so as to connect the secondary frame with the main frame that the main load will be equally distributed on the three wheels and at the same time, permit the said wheels with connected frame to rise or fall over obstructions without permitting any wheel to leave the ground or transmit any strain or undue movement to the main frame.

Other objects will hereinafter appear.

Figure 1 is a plan view of the tractor; Fig. 2 is a side elevation of same; Fig. 3 is a plan view showing a double arrangement of the driving unit.

A indicates the main frame of a traction engine of like vehicle, B a secondary frame, and C a three-wheel traction unit mounted in same. The tractor is otherwise provided with an internal combustion engine 2, a standard form of transmission 3, and a jack-shaft 4 journaled crosswise of the frame in bearings 5, to which power is transmitted through beveled gears 6. The secondary frame is pivotally mounted and carried by the main frame by projecting trunnions 7, supported in bearings 8 on the main frame, and the several wheels, 9, 10 and 11 of the traction unit are mounted upon shafts 12 and 13 respectively, which in turn, are journaled in the secondary frame. Power is transmitted to shaft 12 with connected traction wheels 9 and 10 by means of the sprocket chain 14, which is carried by sprocket wheels 15 and 16, secured upon the jack shaft and the rear driving shaft 12, respectively, and power is in turn transmitted from shaft 12 to shaft 13 in a similar manner, by means of a sprocket chain 17. Power is thus transmitted to each individual wheel of the unit from jack shaft 4, and the speed of said shaft is controlled in the usual manner by the transmission.

The pivotal mounting of the secondary frame permits this—with connected traction wheels 9, 10 and 11, to rise and fall with relation to any obstructions on the ground without transmitting any strain or excessive movement to the main frame. The position of trunnions 7, by which the secondary frame is carried, is such that the weight of the main frame is thoroughly equalized upon the wheels of the traction unit. These can therefore rise and fall with relation to uneven surfaces without losing any of their tractive force.

The three-wheel traction unit herewith shown, has a great advantage over the common two-wheel tractors now mostly used, as three distinct traction points are secured. This not only produces much larger gripping surface and bearing area, but also prevents slipping to a great extent, as one wheel is pulling up over an obstruction, while the others are pushing. In this way it will be almost impossible to bury the wheels, when driving in sand or loamy loose soil.

Another advantage of the present construction consists in the provision of the secondary frame. The pivotal mounting of said frame with relation to the main frame at a point between the bearing wheels, permits these to pass over considerable obstructions without transmitting much jar or movement to the main frame, as they swing easily about trunnions 7.

By referring to Fig. 3, it will be seen that a double traction unit has been employed. This is constructed exactly similar to the tractor shown in Fig. 1, with the only exception, that jack shaft 4 is provided with a differential 4ª.

While the foregoing description mostly pertains to a traction engine drive, it will be understood that it is equally applicable to motor trucks and like vehicles.

I wish it understood that various changes in form, proportions and minor details of construction may be resorted to within the scope of the appendant claims, and that I do not wish to limit myself to the specific design and construction here shown.

Having thus described my invention, what I desire and claim by Letters Patent, is—

1. In a traction engine, a main supporting frame, a secondary frame pivotally mounted on said frame, a pair of shafts journaled in said frame, a pair of traction wheels secured to the rearmost of said shafts, a single traction wheel secured to the foremost of said shafts, a motor mounted on the main frame, means for transmitting power from said motor to the rearmost shaft in the secondary frame, and means for transmitting power from said shaft to the foremost shaft.

2. In a traction engine, a main supporting frame, a secondary frame pivotally mounted in the main frame, a plurality of wheels journaled in the secondary frame to support and drive the tractor, and means for transmitting power to said wheels.

3. In a traction engine, a main supporting frame, a secondary frame pivotally mounted in the main frame, a three wheel unit journaled in the secondary frame to support and drive the tractor, and means for transmitting power to each wheel in said unit.

In testimony whereof I have hereunto set my hand in the presence of two subscribing witnesses.

GEORGE K. COLE.

Witnesses:
F. P. ROYLE,
S. G. BUTTON.